United States Patent
Zortman

(10) Patent No.: US 9,083,460 B1
(45) Date of Patent: Jul. 14, 2015

(54) METHODS AND DEVICES FOR OPTIMIZING THE OPERATION OF A SEMICONDUCTOR OPTICAL MODULATOR

(71) Applicant: Sandia Corporation, Albuquerque, NM (US)

(72) Inventor: William A. Zortman, Corrales, NM (US)

(73) Assignee: Sandia Corporation, Albuquerque, NM (US)

( * ) Notice: Subject to any disclaimer, the term of this patent is extended or adjusted under 35 U.S.C. 154(b) by 55 days.

(21) Appl. No.: 14/024,559

(22) Filed: Sep. 11, 2013

(51) Int. Cl.
*H04B 10/08* (2006.01)
*H04B 10/079* (2013.01)

(52) U.S. Cl.
CPC .............................. *H04B 10/07953* (2013.01)

(58) Field of Classification Search
CPC ..................... H04B 10/0795; H04B 10/07953; H04B 10/07955
USPC .................................................. 398/192–195
See application file for complete search history.

(56) References Cited

U.S. PATENT DOCUMENTS

| | | | |
|---|---|---|---|
| 6,282,006 B1 * | 8/2001 | Tamada et al. | 398/136 |
| 7,019,332 B2 * | 3/2006 | Vieira et al. | 257/82 |
| 2003/0095737 A1 * | 5/2003 | Welch et al. | 385/14 |
| 2004/0052281 A1 * | 3/2004 | Hamajima et al. | 372/38.01 |

OTHER PUBLICATIONS

Watts et al., "Vertical Junction silicon microdisk modulators and switches", Optics Express, Oct. 24, 2011, V. 19, No. 22.
Zortman et al., "Bit Error rate monitoring for active wavelength control of silicon microphotonic resonant modulators", IEEE Micro, Feb.-Mar. 2013.

* cited by examiner

*Primary Examiner* — Dzung Tran
(74) *Attorney, Agent, or Firm* — Martin I. Finston

(57) ABSTRACT

A semiconductor-based optical modulator includes a control loop to control and optimize the modulator's operation for relatively high data rates (above 1 GHz) and/or relatively high voltage levels. Both the amplitude of the modulator's driving voltage and the bias of the driving voltage may be adjusted using the control loop. Such adjustments help to optimize the operation of the modulator by reducing the number of errors present in a modulated data stream.

12 Claims, 4 Drawing Sheets

METHODS AND DEVICES FOR OPTIMIZING THE OPERATION OF A SEMICONDUCTOR OPTICAL MODULATOR

GOVERNMENT LICENSE RIGHTS

This invention was developed under Contract DE-AC04-94AL85000 between Sandia Corporation and the U.S. Department of Energy. The U.S. Government has certain rights in this invention.

INTRODUCTION

Devices for altering the propagation of electromagnetic radiation, such as by modulation, represent fundamental building blocks for many technical endeavors. Modulation refers generally to the time-wise variation of a property of an electromagnetic wave or signal, these properties including, without limitation, amplitude, phase, spectral content, polarization, or the like. A time-varying control signal (oftentimes, a data signal) is used as a source to impart the modulation. Optical modulation refers to the modulation of at least one optical signal, where "electro-optic" modulation in particular refers to the use of an electrical input signal (generally a data signal) to modulate a continuous wave (CW) optical signal.

In some arrangements, an electro-optic modulator comprises a pn junction device that is integrated with, or connected to, an optical resonator (e.g., silicon ring or disk resonator). An electrical data signal may be applied across the pn junction, where the transitions in the value of the data signal modulate (vary) the CW optical signal. During typical operation, where the data signal consists of essentially the same number of 1's and 0's over an extended period of time, a modulator will operate half of the time in a forward bias mode and half of the time in a reverse bias mode. Such modulators are often operated such that their optical carrier frequencies are on the longer wavelength side of a selected resonance associated with the optical resonator. During such an operation, the reverse bias mode of the modulator is configured to output a low level signal ("zero" or "0" level signal) and the forward bias mode of the modulator is configured to output a high level signal ("one" or "1" level signal). This occurs because the forward-biased operation of the modulator has a low enough input signal amplitude that very few charge carriers are injected into the diode region of the modulator. That is, the forward bias portion of the signal is still below the diode turn-on voltage and is still able to take advantage of the large change in charge depletion (per incremental voltage difference) that occurs between 0 volts (V) and the diode turn-on level.

However, the aforementioned modulator operation may fail if the DC bias placed on an electrical signal input into the modulator increases to a value where diode turn-on occurs, thus injecting carriers into the diode region. Modulator operation may also fail if the amplitude of the electrical signal (at a given bias point) causes the modulator to operate in a forward-bias condition. In the case of a silicon-based modulator, the injected charge carriers may require approximately 1 nanosecond to recombine within the pn junction of the modulator's resonator. Under these conditions the modulator will tend to stay in the forward bias or high optical power level state (logical "1" state) outside of the time period associated with a given digital bit (i.e., the "bit period") for high signal transmission rates, typically rates exceeding about 1 GHz. Typically, this may not cause problems so long as the DC bias of the modulator does not cause the associated peak voltage to exceed the diode turn-on point (typically, about 700 milli-Volts (mV)). However, modulators that are monolithically integrated with CMOS devices, or are used in high-temperature applications, harsh environments, or at data rates in excess of 10 GHz can reach forward bias at lower drive voltage thresholds. Additionally, normal aging of a device may result in changes to its peak voltage over time, and result in the peak voltage of the applied signal exceeding the forward bias threshold of the pn junction. Further, the drive voltage threshold at which a modulator will reach forward bias may vary in an environment where temperature fluctuations may occur frequently. Still further, the shape of the modulator's Lorentzian transfer function may change as a result of the effects described above, or due to fluctuations in the amount of optical power coupled into the device. These conditions, among others, may result in a reduction in the extinction ratio of the device (where the extinction ratio is a ratio of the power level associated with a digital, logical "1" to the power level associated with a digital, logical "0").

Furthermore, limiting the forward bias point of a modulator to 0 Volts (V) may limit the extinction ratio of the transmitter. Accordingly, it is desirable to drive the modulator to the edge of its diode turn-on voltage in order to maximize the extinction ratio of the transmitter while minimizing the drive voltage. This, in turn, leads to a maximum width depletion region which may be advantageous, even for small temperature variations, where the shape of the Lorentzian transfer function changes.

In view of the above discussion, it is desirable to provide methods and devices for optimizing the operation of a semiconductor, optical modulator. Further, it is desirable to provide methods and devices for optimizing the amplitude of a drive signal and/or the forward bias point of a semiconductor, optical modulator.

SUMMARY

In one embodiment, the present invention comprises a semiconductor optical modulator that includes a control loop for monitoring bit errors in an optical output signal, and adjusting voltage conditions of the modulator's electrical drive signal, $V_d(t)$ in the presence of an excess number of logical "1" errors. The control loop tracks the number of logical "1" errors in the modulated optical signal and generates a control signal to adjust the voltage level and/or DC bias of the electrical drive signal to keep these errors below a selected threshold value.

In another embodiment, a semiconductor optical modulator may comprise: (i) a redundant receiver for receiving a modulated optical signal and converting the received optical signal into an electrically equivalent data signal; (ii) a processor for receiving the equivalent data signal and an original input data signal, comparing the equivalent data signal to the original input data signal to identify data errors in the equivalent data signal, and transmitting a control signal associated with results of the comparison to a driver circuit; and (iii) a driver circuit for receiving the control signal and for controlling voltage conditions based on the received control signal. The modulator may further comprise: (iv) an optical waveguide for supporting propagation of an input optical signal, (v) an optical resonator (e.g., ring or disk shaped) formed on a surface of a semiconductor substrate (e.g., silicon) and disposed in evanescent communication with the optical waveguide and configured to have a resonant wavelength to evanescently couple the input optical signal between the optical waveguide and the optical resonator; and (vi) an optical coupler for coupling a portion of the modulated optical signal to a waveguide connected to the redundant receiver.

The redundant receiver may further comprise a photodetector for converting a received, coupled portion of the modulated optical signal into the electrically equivalent signal.

In the embodiments described above the processor may further comprise: (a) a comparator for comparing logical bits of the electrically equivalent data signal to logical bits of the original input data signal; (b) a counting module for counting a number of logical "0" errors and a number of logical "1" errors during a period of time based on the results of the comparisons made by the comparator, and calculating a percentage of total errors that are logical "1" errors; and (c) a threshold detector operable to receive the percentage of total errors from the counting module, and to generate the control signal based on whether or not the calculated percentage is above a threshold. The control signal may comprise a signal used to reduce the amplification of the modulated signal, or a signal to reduce a bias voltage of the modulated signal, or yet further, a signal to reduce both the amplification and bias voltage of the modulated signal.

In alternative embodiments of the invention the modulator may comprise a structure selected from the group consisting of a monolithic integrated structure, a flip-chip bonded structure, a vertically-stacked structure, a three-dimensionally integrated arrangement, a two-dimensionally integrated arrangement and a standalone circuit.

In addition to the devices described above and herein, the present invention also provides inventive methods for controlling a semiconductor optical modulator. For example, in one embodiment such a method may comprise: receiving a modulated optical signal from an optical resonator (e.g., ring or disk shaped); converting the received optical signal into an electrically equivalent data signal; receiving the equivalent data signal and an original input data signal; comparing the equivalent data signal to the original input data signal to detect data errors in the equivalent data signal; transmitting a control signal to a driver circuit; and receiving the control signal at the driver circuit to control voltage conditions. Yet further, this method may additionally comprise comparing logical bits of the electrically equivalent data signal to logical bits of the original input data signal; counting a number of logical "0" errors and a number of logical "1" errors during a period of time based on the results of the comparisons, and calculating a percentage of total errors that are logical "1" errors; receiving the percentage of total errors from the counting module; and generating the control signal based on whether or not the calculated percentage is above a threshold.

Similar to the description of the devices above, in exemplary methods of the present invention the control signal may comprise a signal to reduce amplification of the modulated signal, or a signal to reduce a bias voltage of the modulated signal or a signal to reduce both the amplification and bias voltage of the modulated signal.

In addition to the steps described above, the method may additional comprise the step of evanescently coupling an input optical signal between an optical waveguide and the optical resonator.

Additional features and advantages of the invention will be apparent to those skilled in the art from the following detailed description and appended drawings.

DETAILED DESCRIPTION, INCLUDING EXAMPLES

Throughout the following description and drawings, like reference numbers and/or characters refer to like elements. It should be understood that, although specific exemplary embodiments are discussed herein there is no intent to limit the scope of present invention to such embodiments. To the contrary, it should be understood that the exemplary embodiments discussed herein are for illustrative purposes, and that modified and alternative embodiments may be implemented without departing from the scope of the present invention.

It should be further noted that some exemplary embodiments may be described and claimed as a process or method (hereafter "method"). Though a method may be described and claimed as set of sequential steps, it should be understood that the steps may be performed in parallel, concurrently or simultaneously. In addition, the order of each step within a method may be re-arranged. A method may be terminated when completed, and may also include additional steps not necessarily described herein. A method may correspond to functions or processes completed by a physical system, or a component of a system.

As used herein the word "processor" means a hardware device or physical structure that is operable to implement and/or complete the features, functions, methods and processes of the present invention (e.g., comparisons, counting, storage). The processor may comprise a device or structure that is operable to access and execute instructions stored in physical memory for completing such features, functions, methods and processes. Further, the processor may be operable to access, manipulate and transform data represented as physical, electronic quantities into other data similarly represented as physical quantities. Unless specifically stated otherwise, or as is apparent from the discussion, the phrase "operable to" means at least: being configured to complete, or having the capability of operating to complete, and/or is operating to complete, specified features, functions, process steps, for example.

As used herein, the term "and/or" includes any and all combinations of one or more of the associated listed items. It should be understood that if an element is referred to, or depicted, as being connected to another element it may be directly connected to, or indirectly connected to another element (i.e., additional elements may form a connection between elements), unless otherwise specified or understood by the context of the description or drawings. As used herein, the singular forms "a," "an" and "the" are not intended to include the plural form unless the context clearly indicates otherwise.

As used herein, the term "embodiment" refers to an example of the present invention.

Figure 1:
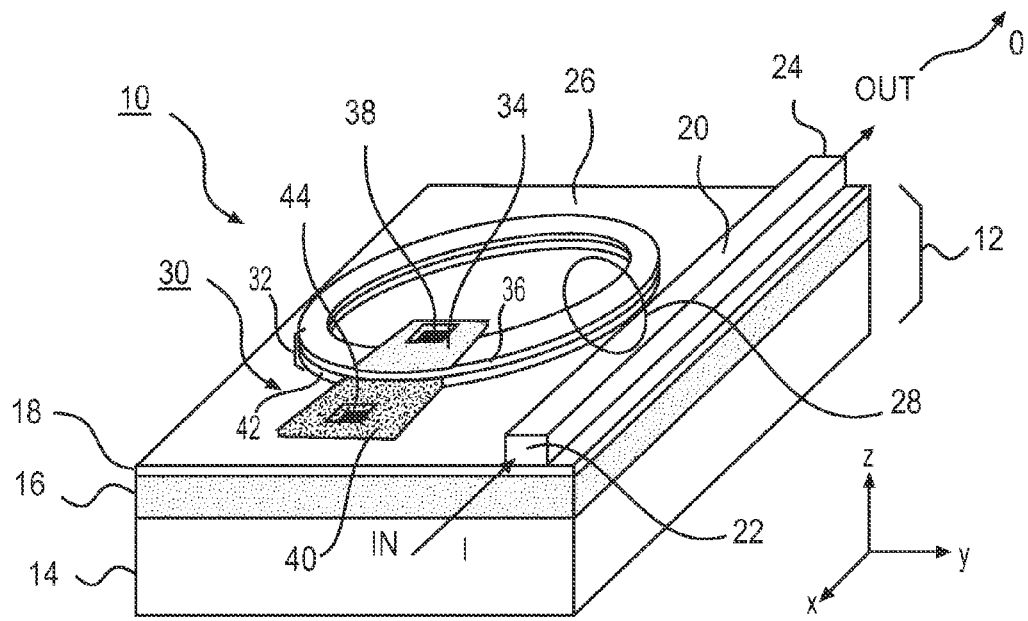
FIG. 1 is a simplified perspective view of an optical modulator.
Figure 2:
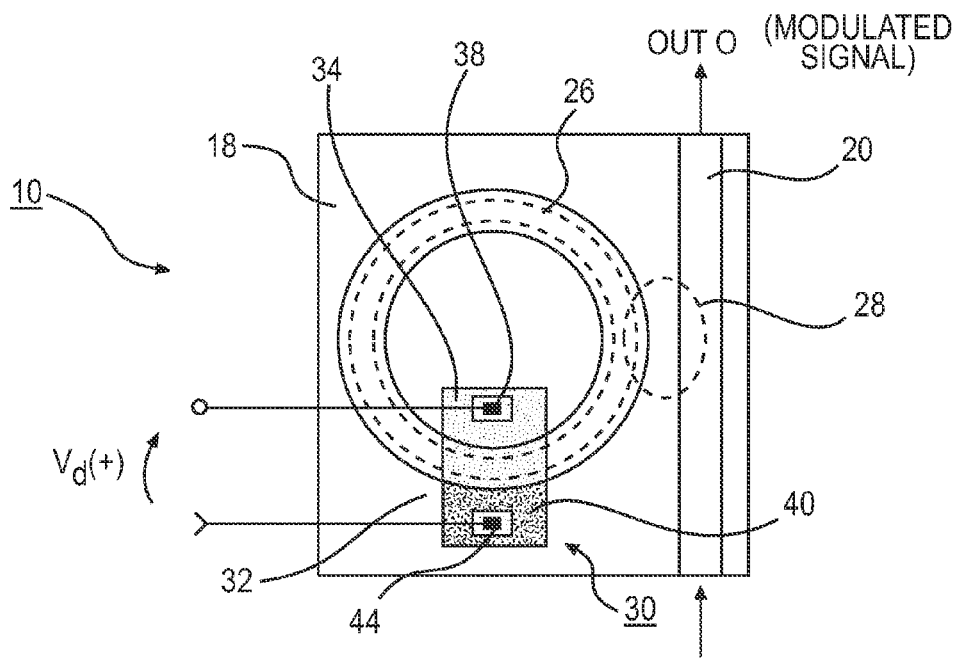
FIG. 2 is a top view of the modulator of FIG. 1.

FIG. 1 is a perspective view, and FIG. 2 is a top view, of an optical modulator 10, useful in understanding the innovations provided by the present invention. In this particular example, modulator 10 is formed on a silicon-on-insulator (SOI) platform 12, although it is to be appreciated that the SOI platform is exemplary only and an optical modulator may be formed on any suitable semiconductor platform (typical choices being silicon, germanium or indium, for example). Referring to FIG. 1, SOI platform 12 consists of a silicon substrate 14, an overlying insulating layer 16 (usually comprising $SiO_2$) and a relatively thin silicon surface layer 18 (also referred to in the art as an "SOI layer"), where SOI layer 18 is typically less than one micron in thickness.

Optical modulator 10 comprises an optical waveguide 20 having an input port 22 for receiving an optical input signal, "I", from a laser source (not shown) or other appropriate light source, and also having an output port 24 from which a modulated optical output signal, O, may exit. Optical input signal I may be a CW signal or, perhaps, a pulsed input signal. Optical modulator 10 further comprises a ring resonator 26 that is disposed in evanescent communication with optical waveguide 20 along a coupling region 28, as best shown in FIG. 2. In accordance with the properties of ring resonator 26, an optical signal propagating along optical waveguide 20 at a selected wavelength $\lambda_R$ will be evanescently coupled into ring resonator 26.

Although illustrated as circular, it should be understood that the structure of resonator 26, and those resonators made in accordance with embodiments of the present invention described herein, may comprise a "ring" or "disk" geometry, and may be circular, oval, elliptical or any type shape suitable for the particular requirements of a specific modulator.

Optical modulator 10 further comprises an electrically-controllable, free carrier control structure 30 that is integrated within a portion of ring resonator 26. As shown, the free carrier control structure 30 includes a pn junction 32 created by adding appropriate dopants to the semiconductor material used to form ring resonator 26. Free carrier control structure 30 further comprises a first extension 34 that extends from a "p" region 36 of pn junction 32 and terminates at a first ohmic contact 38. Similarly, control structure 30 comprises a second extension 40 that extends from an "n" region 42 of pn junction 32 and terminates at a second ohmic contact 44. As shown in FIG. 2, an electrical voltage signal $V_d(t)$ is applied as an input "drive" signal between ohmic contacts 38 and 44. In accordance with the operation of modulator 10, drive signal $V_d(t)$ is representative of a digital input data signal "D", comprising a first voltage level (e.g., $V_+$) representing a logical "1" value and a second voltage level (e.g., $V_-$) representing a logical "0" value. Signal $V_d(t)$ may either be an AC-coupled signal, or a differential signal that varies about a defined DC value (the DC value defined as the input "bias voltage").

Electrical data signal D, embodied in drive voltage $V_d(t)$, is used to modulate the input CW optical signal, I, to create the modulated optical output signal, O. In particular, the electrical voltage $V_d(t)$ applied between ohmic contacts 38 and 44 creates a free carrier effect that perturbs an effective resonant optical path length of ring resonator 26 such that ring resonator 26 is brought into and out of a resonance condition in accordance with logic values (i.e., 1, 0) of digital input data signal D.

As known in the art, semiconductors such as silicon, germanium or indium are subject to a free carrier effect in which the real and/or imaginary components of a material's refractive index are altered according to a population of free carriers therein. Because the electrical drive signal $V_d(t)$ affects the free carrier populations in p region 36 and/or n region 42, drive signal $V_d(t)$ at least partially controls a free carrier population in the resonant light path circulating within resonator 26.

This, in turn, results in changes to the effective resonant path length of ring resonator 26, causing the resonator to operate within, and then outside of, its resonance condition, as drive signal $V_d(t)$ changes between different voltage levels. As a result, the amount of evanescent coupling between waveguide 20 and ring resonator 26 will also change. Input optical signal, I, is thus modulated by this change in evanescent coupling, creating modulated optical output signal, O, that correspond to the data pattern of the input electrical drive signal.

Figure 3A:
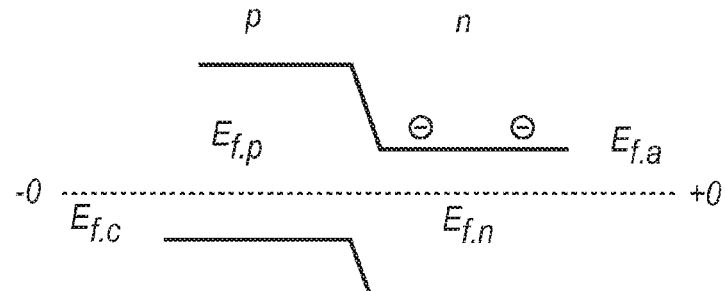
FIGS. 3A-3C contain energy band diagrams illustrating the movement of injected carriers within an optical modulator.
Figure 3B:
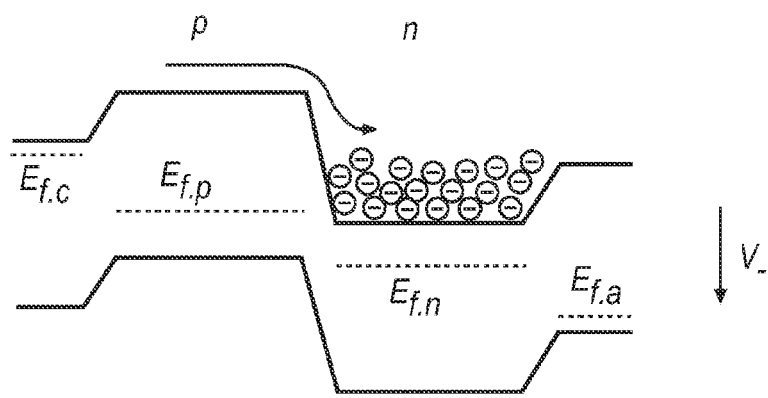
Figure 3C:
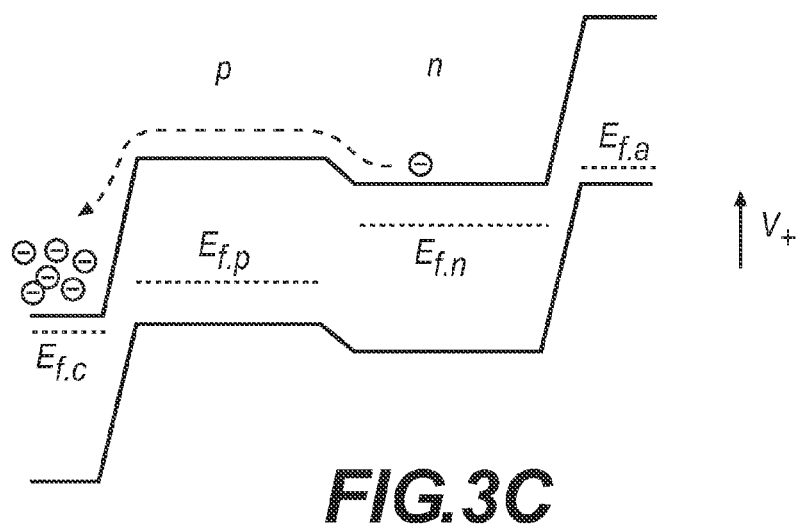

FIGS. 3A-3C illustrate energy band diagrams associated with pn junction 32 of optical modulator 10 as shown in FIGS. 1 and 2, showing the results of applying a reverse-bias voltage across the pn junction (FIG. 3B) and applying a forward-bias voltage across the pn junction (FIG. 3C). For the purposes of illustration, n region 42 may be defined as the cathode of pn junction 32 (having a Fermi level $E_{f,c}$), and p region 36 may be defined as the anode of pn junction 32 (having a Fermi level $E_{f,a}$). There is a depletion region between p region 36 and n region 42 that contains a relatively few number of free carriers (i.e., holes and electrons). FIG. 3A illustrates an energy band diagram applicable for free electron carriers when there is no applied voltage (shown as the "+0" level), that is, when there is no electrical data signal applied as an input to resonator 26. As illustrated in FIG. 3B, when there is a negative voltage, V−, applied from the anode to the cathode (i.e., reverse bias), the potential barrier between p region 36 and n region 42 increases (as seen by the change in potential levels of both these regions).

As described above, changes in the carrier concentration within the p and n regions causes a change in the refractive index of the semiconductor material forming these regions. This change in the number of carriers in the depletion region (also physically seen as a widening of the depletion region under reverse bias) is the phenomenon used by this type of optical modulator to shift its refractive index and provide optical modulation through a shift in the resonant frequency. As illustrated in FIG. 3C, when there is a positive voltage, $V_+$, applied from the anode to the cathode (i.e., forward bias), free electron carriers are injected into the diode as a result of the lowering of the potential barrier across the depletion region. Complementary activity occurs for hole populations (not shown) with respect to p region 36. The particular magnitude of the driving voltage $V_{+,-}$ would be readily determinable by one skilled in the art as affected by the particular dopant levels, semiconductor materials, and pn geometry used. Typical values of V− for silicon-based implementations (bandgap=1.1 eV) would be in the range of 0-12 volts. It is to be appreciated that the energy band diagrams of FIGS. 3A-3C represent a relatively simplified explanation of the physics underlying the operation of pn junction 32, and that there may be combinations of electron and hole population variations in one or more of regions 36 and 42 that are simultaneously occurring in various ways.

As discussed above, various factors affect the performance of an optical modulator, not the least of which is the level of the electrical voltage applied to a resonator as it switches between the two logic levels (i.e., between $V_+$ and V− shown in FIGS. 3A to C). In particular, as mentioned above, there may be incomplete recombination of the carriers moving within a pn junction when an input electrical signal D is a logical "1" value (for example) prior to the transmission of the next bit in the data input signal. Those skilled in the art may operate the modulator by using only depletion region expansion and contraction, avoiding the possibility of the forward bias turn-on that injects carriers as a result of the recombination time of the injected carriers. Even under these conditions, however, if a long string of logical 1's is being transmitted, the build-up of carriers becomes problematic, in effect causing a logical "1" data bit to overhang into adjacent bit periods (causing intersymbol interference (ISI) and degrading the extinction ratio of the modulator), in general creating errors in the transmitted optical data signal.

Accordingly, embodiments of the present invention overcome these and other problems associated with optimizing the performance of an optical modulator by including a control loop with a modulator between an optical output signal and an electrical drive signal input. The control loop monitors the modulated output signal, O, and, as needed, adjusts the voltage conditions of drive signal, $V_d(t)$ to optimize the voltage signal used as the electrical data input signal to a resonator. Accordingly, it is possible to avoid injecting carriers into the pn junction of the resonator at the peak of the voltage signal. Hence, the number of logical "1" errors in the output signal may be reduced. The adjustments to the voltage conditions may include adjusting the amplitude of the voltage signal, the DC bias level of the voltage signal, or both the amplitude and bias level.

Figure 4:
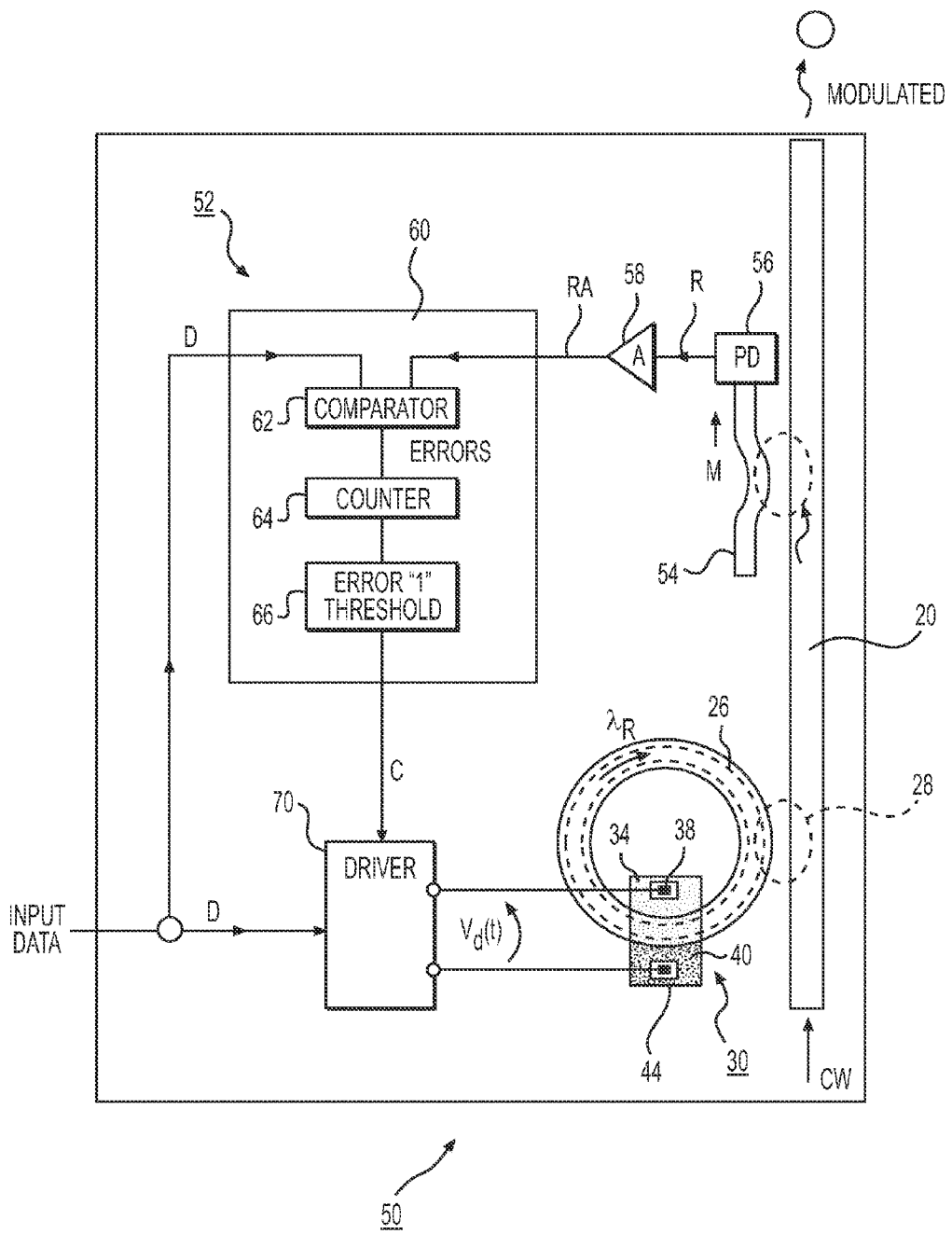
FIG. 4 is a simplified diagram of an exemplary optical modulator formed in accordance with an embodiment of the present invention.

FIG. 4 illustrates an exemplary optical modulator 50 formed in accordance with an embodiment of the present invention. In comparing the elements of FIG. 1 to those of FIG. 4, it is seen that the optical waveguide and ring resonator components may be the same and carry the same reference numerals (i.e., optical waveguide 20 and being resonator 26). Electrically-controllable free carrier control structure 30 may also be similar to the arrangement as shown in FIGS. 1 and 2, providing the modulating drive signal $V_d(t)$ (representing input data signal D) across ohmic contacts 38 and 44 of pn junction 32. In the particular embodiment shown in FIG. 4, optical modulator 50 also comprises an electrical driver circuit 70 that is operable to receive a digital input data signal D and generate the drive signal $V_d(t)$ therefrom. As mentioned above, the drive signal may be an AC-coupled signal, or a signal with a defined DC bias voltage, where the drive signal modulates about the bias voltage level. An exemplary type of driver circuit may a CMOS-based arrangement or rectifier for creating a voltage signal of a controllable amplitude and/or bias voltage value.

In accordance with the present invention, modulator 50 also includes a control loop 52 operable to detect and identify data value errors in the modulated optical output signal and generate a control signal, "C", that adjusts the amplitude and/or DC bias of the drive signal as a function of the percentage of errors associated with logical "1" bits (referred to as "logical 1 errors").

In accordance with an embodiment of the present invention, control loop 52 includes an optical coupler 54 disposed in evanescent communication with an output portion of optical waveguide 20. Optical coupler 54 may be configured to receive a relatively small portion of the modulated optical output signal (e.g., about 10% of the total signal power), and couple such a portion to a waveguide (not labeled in FIG. 4) that is connected to a photodetector 56.

The relatively small portion may be referred to as an optical modulation monitor signal, M. Such a signal may be applied as an input to a photodetector 56. The photodetector 56 is operable to convert the received, coupled portion of the modulated optical signal into an electrically equivalent signal. For the purposes of the present discussion, this converted signal may be referred to as a "recovered" data signal, "R". In the absence of error, the recovered signal, R, is expected to be the same as the original data signal and, therefore, also the same as the signal ultimately captured by a remotely-located receiver (not shown in the figures). This portion of control loop 52 (i.e., elements 54, 56 and 58) may be referred to as a "redundant receiver". Depending on a variety of factors, an electrical signal amplifier 58 may be used to boost recovered data signal R (shown as signal "RA" in FIG. 4).

As shown in FIG. 4, recovered (and perhaps amplified) data signal RA may be applied as an input to a processor 60, while an original data signal D is applied as a second input to processor 60. In accordance with the present invention, processor 60 may be operable to synchronize the input signal and the recovered, electrically equivalent data signal (using a local clock signal, for example). The synchronized signals may then be applied as separate inputs to a comparator 62, among other elements, that identifies data errors within the recovered signal. For example, when an original input signal is a logical "1" during a specific bit time period, and the recovered (and synchronized) electrically equivalent data signal is a logical "0" for the same period, an error has occurred which may be identified by the comparator 62, etc. The comparator 62 may comprise logic gates, for example.

The output from comparator 62 is thereafter applied to a counting module 64. In accordance with an embodiment of the present invention, counting module 64 may be operable to count the specific number of logical "1" errors and the specific number of logical "0" errors during an exemplary time period. As mentioned previously, injected carriers take approximately 1 ns to recombine in a pn junction region of a silicon-based device. Therefore, as the data rate for incoming data signal D exceeds 1 GHz (for example), the higher voltage associated with a logical "1" state will cause some of the injected carriers to carry over into the next bit slot. In accordance with an embodiment of the present invention, a counting module 64 may be utilized to count the number of errors, and determine how many of the errors are logical "0" errors, and how many are logical "1" errors. Counting module 64 may be further operable to store this information for a time period, and then determine the percentage of the total collected errors that are logical "1" errors.

A threshold detector 66 may be included in processor 60 to receive the percentage information from the counting module 64. Threshold detector 66 may be operable to utilize a selected (e.g., adjustable) threshold value of logical "1" errors that is acceptable for a particular application of this modulator. Accordingly, threshold detector 66 functions to determine whether the number of logical "1" errors (as defined by the received percentage information) exceeds the selected threshold value. If it is determined that the number of logical "1" errors exceeds the selected threshold value, it can be presumed that the voltage associated with a logical "1" is too high (i.e., injected carriers are still present in the next bit slot). In this case, and in accordance with the present invention, threshold detector 66 is operable to generate a control signal "C", and forward the control signal C to driver circuit 70. Upon receiving the control signal C, driver circuit 70 may be operable to control voltage conditions. For example, the driver circuit 70 may reduce the DC bias level and/or amplitude used as the drive signal input $V_d(t)$ to resonator 26.

Alternatively, if it is determined that the percentage of logical "1" errors is below the selected threshold value, no adjustment in voltage signal conditions may be necessary. However, in one embodiment of the present invention, threshold detector 66 may be operable to generate a second control signal for slightly increasing the drive voltage (i.e., either increasing the amplitude or raising the DC bias voltage, or both), which is advantageous in improving the performance of modulator 50 by increasing its extinction ratio. These increases may be performed unless, and until, a voltage level limit is reached (or, of course, until the point in time when the threshold for logical "1" errors is exceeded).

While the arrangement of FIG. 4 depicts control loop 52 formed as an integral part of optical modulator 50, it is to be understood that the control loop may alternatively comprise an optical modulator control circuit formed as a separate and discrete apparatus, and then connected to an optical modulator. In this case, various other components may be used to perform the same functionality. For example, an optical fiber may be used as optical coupler 54. Regardless of its implementation as discrete apparatus or an integral component, the control loop performs the same functions of monitoring the modulated optical output signal, counting the number of logical "1" errors and generating a control signal to control the driver circuit's voltage conditions in the presence of an excess of logical "1" errors.

Figure 5:
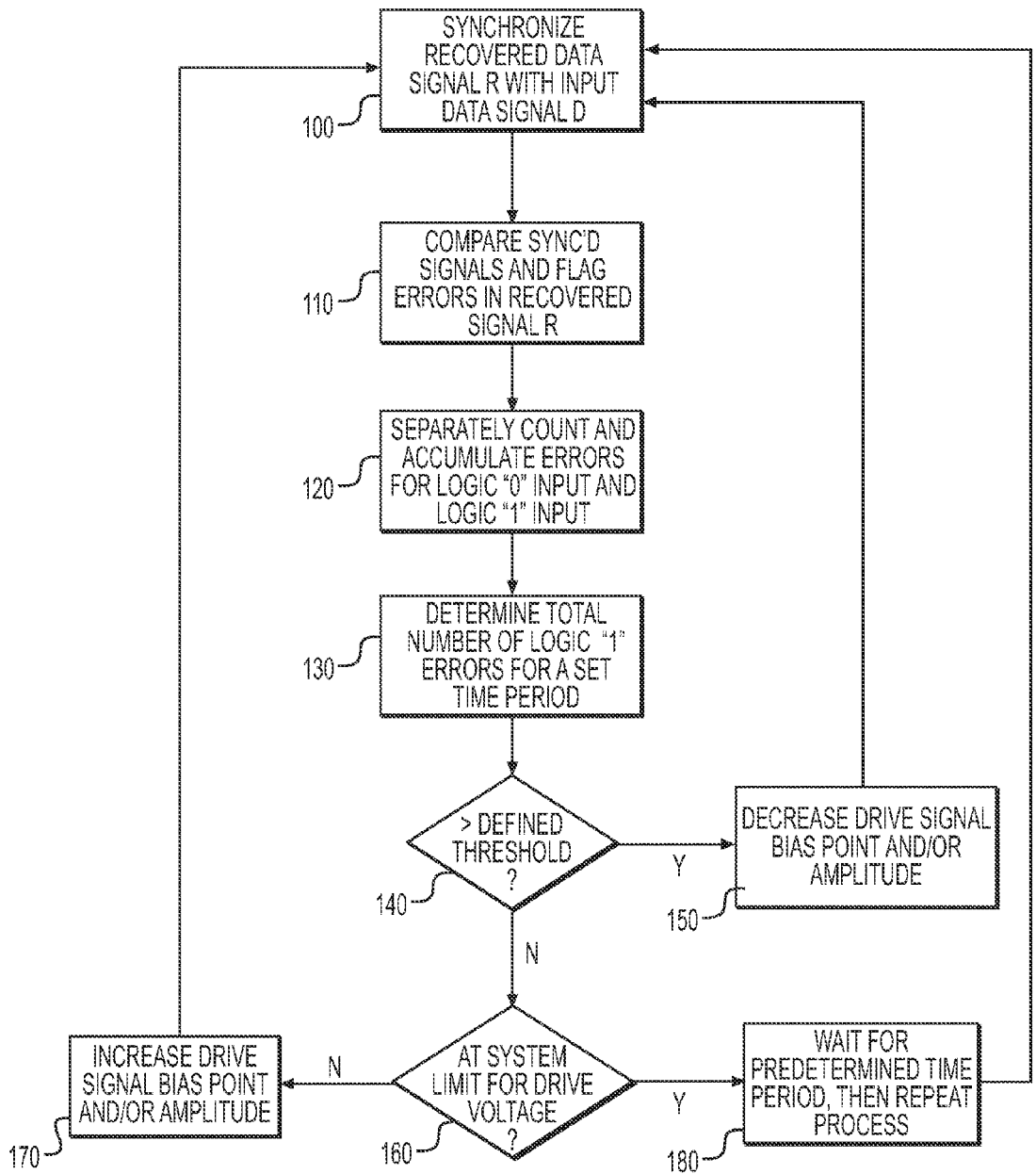
FIG. 5 is a simplified flow chart of a method related to the operation of an optical modulator according to an embodiment of the invention.

The present invention also provides exemplary methods that may be implemented by the devices described herein. Referring now to FIG. 5, there is depicted a flow diagram illustrating an exemplary set of steps in a method as completed by an inventive processor, such as processor 60 shown in FIG. 4, in accordance with an embodiment of the present invention. As shown, the method begins at step 100 where input data signal D is synchronized with recovered, electrically equivalent data signal R, ensuring that the same bit period is used for each signal. Next, in step 110, the signals are compared (e.g., logical bits in the signals are compared), and errors associated with an input logical "0" and errors associated with an input logical "1" are identified, for example.

The identified errors are then counted, as shown in step 120, keeping separate totals of logical "0" errors and logical "1" errors. After these errors have been stored or accumulated for a period of time, the percentage of total errors that are logical "1" errors is determined, in step 130. This percentage may then be compared to a predetermined threshold value in step 140. If it is determined that the threshold has been exceeded, the method continues to step 150, where a control signal is generated that commands the electrical driver circuit to reduce the voltage conditions of drive signal $V_A(t)$ (i.e., decrease the amplitude, decrease the DC bias level, or both). As part of an on-going control loop, the method may proceed back to step 100 and complete another analysis of the modulator's performance.

If, however, it is determined that the percentage of logical "1" errors does not exceed the threshold, the method may include a second comparison (step 160), where it is determined whether or not the current amplitude and/or bias point of the drive signal is at a predetermined limit. If it is determined that the predetermined limit has not been reached, the method may proceed to step 170, where the voltage level (and/or bias point) for drive signal $V_A(t)$ may be increased. Yet further, if it is determined that the drive signal voltage conditions are at their predetermined limits, the method may move to step 180, where no modifications are made to the drive voltage at this time and, after a predetermined period of time, the method may be repeated.

The devices and methods described herein enable the operation of a modulator to be optimized by minimizing the number of errors present in a modulated data stream. Elements of the inventive modulators may be formed as a number of different structures, including, but not limited to, a monolithic integrated structure, a flip-chip bonded structure, a die stacked structure (either a two-dimensional or three-dimensional stacked structure) and a standalone circuit (i.e., if one of the elements is remotely located or connected).

It should be understood that the disclosed embodiments are merely exemplary embodiments of the invention. One of ordinary skill in the art will appreciate that changes and variations to the disclosed components, devices, features and methods can be made without departing from the spirit and scope of the invention as set forth in the appended claims.

What is claimed is:

1. A semiconductor optical modulator comprising:
   a redundant receiver for receiving a modulated optical signal and converting the received optical signal into an electrically equivalent data signal;
   a processor for receiving the equivalent data signal and an original input data signal, comparing the equivalent data signal to the original input data signal to count logical data errors in the equivalent data signal, and transmitting a control signal associated with results of the count to a driver circuit; and
   a driver circuit for receiving the control signal and for controlling voltage conditions based on the received control signal.

2. The semiconductor optical modulator as in claim 1 wherein the processor further comprises:
   a comparator for comparing logical bits of the electrically equivalent data signal to logical bits of the original input data signal;
   a counting module for counting a number of logical "0" errors and a number of logical "1" errors during a period of time based on the results of the comparisons made by the comparator, and calculating a percentage of total errors that are logical "1" errors; and
   a threshold detector operable to receive the percentage of total errors from the counting module, and to generate the control signal based on whether or not the calculated percentage is above a threshold.

3. The semiconductor optical modulator as in claim 1 further comprising:
   an optical waveguide for supporting propagation of an input optical signal; and
   an optical resonator formed on a surface of a semiconductor substrate and disposed in evanescent communication with the optical waveguide and configured to have a resonant wavelength to evanescently couple the input optical signal between the optical waveguide and the optical resonator;
   an optical coupler for coupling a portion of the modulated optical signal to a waveguide connected to the redundant receiver; and
   wherein the redundant receiver further comprises a photodetector for converting a received, coupled portion of the modulated optical signal into the electrically equivalent signal.

4. The semiconductor optical modulator as in claim 3 wherein the substrate comprises silicon.

5. The semiconductor optical modulator as in claim 3 wherein the optical resonator comprises a ring resonator or a disk resonator.

6. The optical modulator as in claim 1 wherein the control signal comprises a signal to reduce amplification of the modulated signal, or a signal to reduce a bias voltage of the modulated signal or a signal to reduce both the amplification and bias voltage of the modulated signal.

7. The optical modulator as in claim 1 wherein the modulator comprises a structure selected from a group consisting of a monolithic integrated structure, a flip-chip bonded structure, a vertically-stacked structure, a three-dimensionally integrated arrangement, a two-dimensionally integrated arrangement and a standalone circuit.

8. A method for controlling a semiconductor optical modulator comprising:
   receiving a modulated optical signal from an optical resonator;
   converting the received optical signal into an electrically equivalent data signal;

receiving the equivalent data signal and an original input data signal;

comparing the equivalent data signal to the original input data signal to count logical data errors in the equivalent data signal;

transmitting a control signal to a driver circuit; and receiving the control signal at the driver circuit to control voltage conditions.

9. The method as in claim 8 further comprising:

comparing logical bits of the electrically equivalent data signal to logical bits of the original input data signal;

counting a number of logical "0" errors and a number of logical "1" errors during a period of time based on the results of the comparisons, and calculating a percentage of total errors that are logical "1" errors;

receiving the percentage of total errors from the counting module; and generating the control signal based on whether or not the calculated percentage is above a threshold.

10. The method as in claim 8 further comprising:

evanescently coupling an input optical signal between an optical waveguide and the optical resonator.

11. The method as in claim 8 wherein the control signal comprises a signal to reduce amplification of the modulated signal, or a signal to reduce a bias voltage of the modulated signal or a signal to reduce both the amplification and bias voltage of the modulated signal.

12. The method as in claim 8 wherein the optical resonator comprises a ring resonator or a disk resonator.

* * * * *